Dec. 25, 1962   R. F. LO PRESTI   3,070,218
FLEXIBLE CONVEYOR ROLLER ASSEMBLY AND CONNECTOR
Filed Dec. 24, 1958   3 Sheets-Sheet 1

INVENTOR.
Roy F. LoPresti
BY
Murray A. Gleeson
ATTORNEY

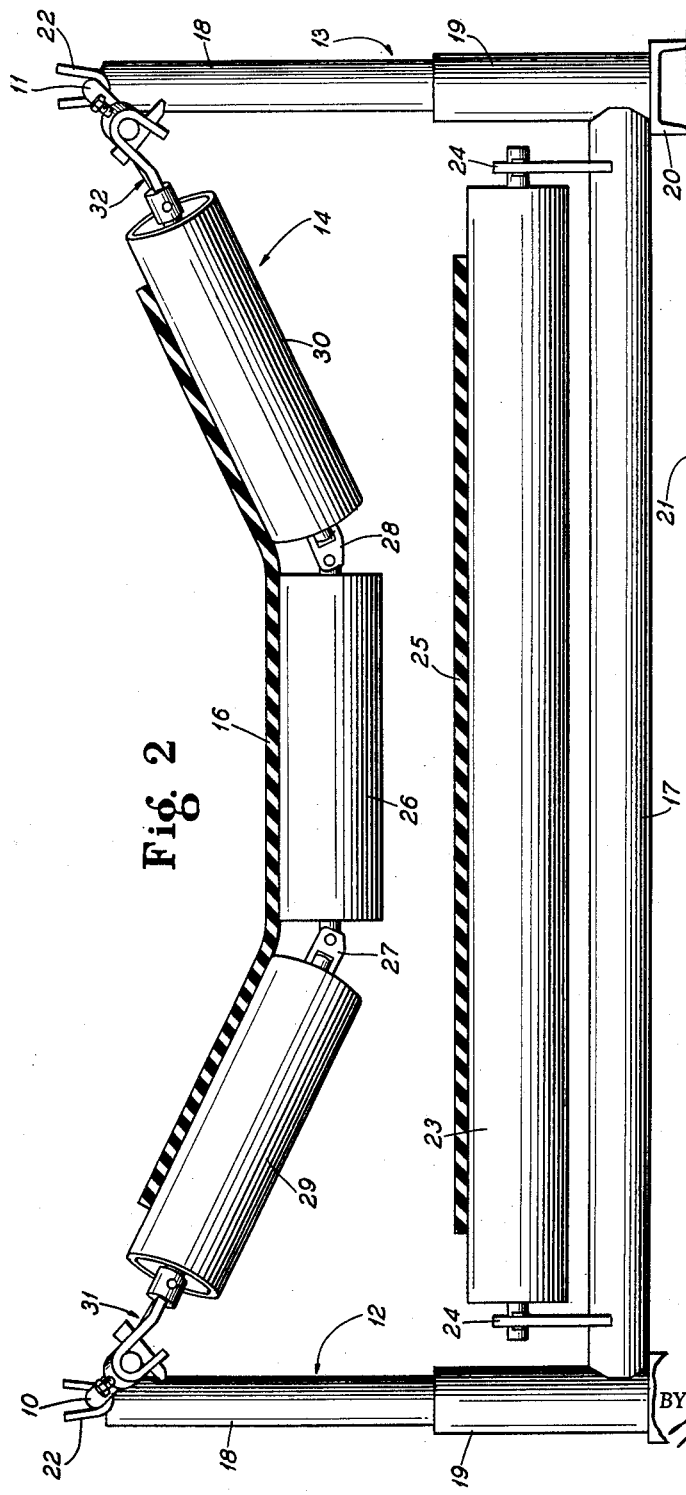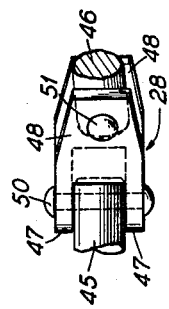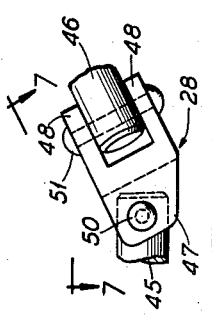

Dec. 25, 1962 R. F. LO PRESTI 3,070,218
FLEXIBLE CONVEYOR ROLLER ASSEMBLY AND CONNECTOR
Filed Dec. 24, 1958 3 Sheets-Sheet 3

INVENTOR.
Roy F. LoPresti
BY
Murray G. Gleeson
ATTORNEY

United States Patent Office 3,070,218
Patented Dec. 25, 1962

3,070,218
FLEXIBLE CONVEYOR ROLLER ASSEMBLY AND CONNECTOR
Roy F. Lo Presti, Chicago, Ill., assignor to Goodman Manufacturing Company, Chicago, Ill., a corporation of Illinois
Filed Dec. 24, 1958, Ser. No. 782,813
10 Claims. (Cl. 198—192)

This invention relates generally to troughing roller assemblies for flexible strand conveyors and specifically to a new and improved roller assembly connector.

Flexible strand conveyors have come into widespread use in recent years for applications requiring movement of solid materials, such as coal or ore, or liquid materials, such as slurries, substantial distances at low cost. A typical conveyor is illustrated for example in the Craggs et al. Patent No. 2,773,257.

These conveyors usually include a pair of parallel flexible strands such as wire ropes hung on support stands spaced at substantially equal intervals. A plurality of troughing roller assemblies are pendently suspended from the ropes between the support stands. The number and spacing of the assemblies will vary from application to application, but usually at least two are positioned between adjacent stands. The assemblies usually comprise a center, primary or load carrying roller flanked by at least a pair of wing rollers. The wing rollers are generally pivotally connected at their inner ends to the primary roller and secured by hooks or other connectors at their outer ends to the flexible strands.

The problem of maintaining the belt centered on the roller assemblies is present in all flexible strand conveyors. When the rollers are canted in an outward direction with respect to the path of movement of the belt, detraining tendencies may be set up which tend to force the belt up one side of the assembly and down the other. This detraining or running wild effect may result from mispositioning of the idler assemblies between the strands. It may even occur in correctly positioned roller assemblies due to displacement from the parallel of portions of the strands between adjacent supports. Finally, even though the assemblies may be properly positioned and proper allowance provided for inward movement of the strands, the frictional drag of the belt on the rollers may pull the assemblies forward to a detraining position.

Various remedies have been proposed. It is well known to utilize a special training roller assembly consisting essentially of an upright roller adapted to engage the edge of the conveyor belt when the belt strays from a centered position. This expedient produces excellent results with both new and old belts but the additional expense may not be justified in some applications. Other training means are known but they usually require considerable adjustment and the training time is correspondingly increased before the belt is ready for operation.

Accordingly, a primary object of this invention is to provide a flexible troughing roller assembly connector which may be quickly and accurately adjusted to change the position of the troughing roller assembly.

Another object is to provide a flexible troughing roller assembly which materially reduces the training time of both old and new belts.

Yet another object is to provide a flexible troughing roller connector which is simple and extremely inexpensive to manufacture.

Another object is to provide a flexible troughing roller assembly connector which may be adjusted to train the belt during belt operation.

Another object is to provide a flexible troughing roller assembly which is self-compensating so that imbalances in the system are automatically corrected during operation.

Another object is to provide a flexible strand troughing roller assembly which may be quickly and easily adjusted to maintain a conveyor belt in a centered position.

Yet a further object is to provide a flexible strand conveyor including a pair of flexible strands, a plurality of troughing roller assemblies suspended between the strands, and means for quickly and easily adjusting the assemblies to maintain a conveyor belt in a centered position.

Other objects and advantages of the invention will become apparent from the following description taken in connection with the accompanying drawings wherein by way of illustration and example certain embodiments of the invention are set forth.

The invention is illustrated more or less diagrammatically in the accompanying drawings, wherein:

FIGURE 2 is a section taken substantially along the line 2—2 of FIGURE 1;

FIGURE 6 is an elevation of a connecting joint between adjacent rollers; and

FIGURE 7 is a view taken substantially along the line 7—7 of FIGURE 6.

Like reference numbers will be used to indicate like parts throughout the specification.

Figure 1:
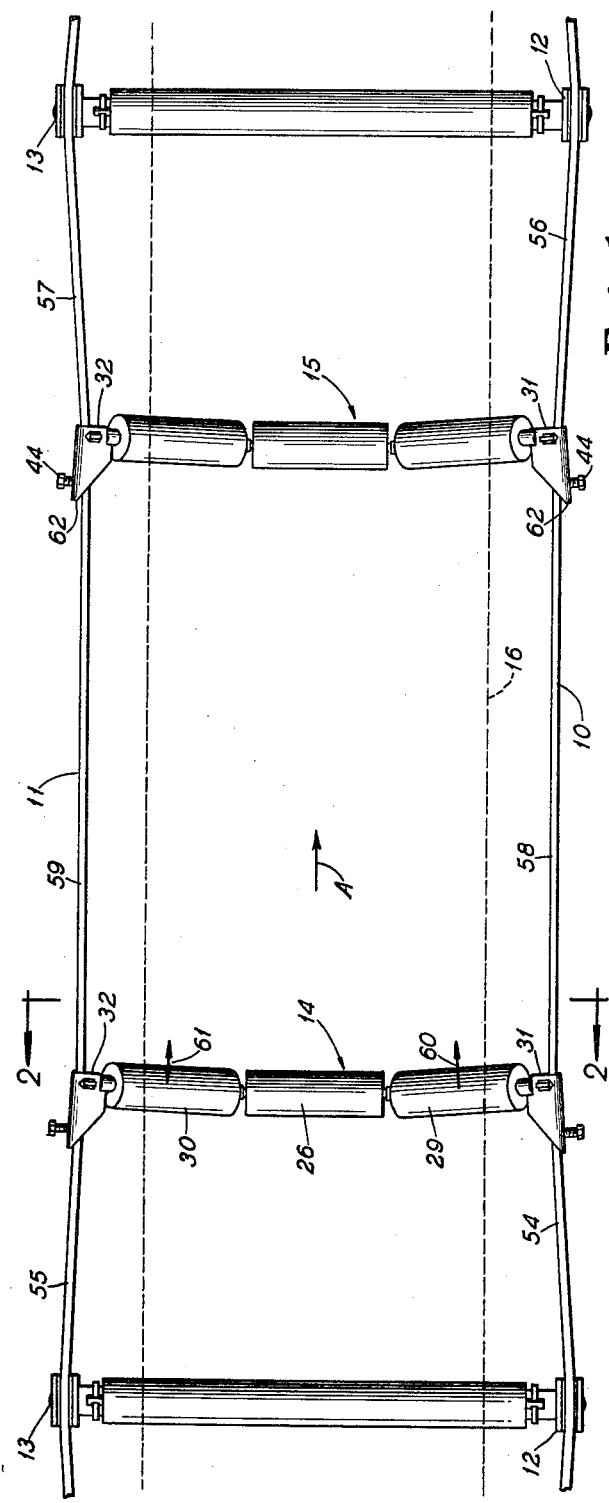
FIGURE 1 is a plan view of a portion of a flexible strand conveyor with a conveyor belt shown in broken lines.
Figure 5:
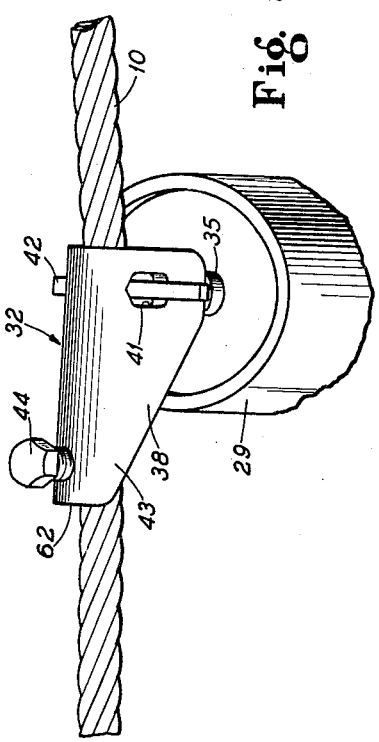
FIGURE 5 is an end view of the structure of FIGURES 3 and 4.

A portion of a flexible strand conveyor is shown in FIGURE 1 as including a pair of flexible strands 10 and 11 suspended at spaced intervals by supporting stands 12 and 13. A plurality of flexible troughing roller assemblies 14 and 15 are hung across the strands. The conveying reach of a conveyor belt is indicated in broken lines at 16 moving in the direction of the arrow A.

In FIGURE 2, the support stands 12 and 13 are shown maintained rigidly spaced by a cross bar 17. Each stand includes an upper member 18 telescopically received in a lower tubular member 19 which in turn rests on foot 20. Any suitable means may be used to vary the height of the telescoping member 18 so as to maintain the top of each stand in a level plane even though the ground level 21 may vary. A pair of U-shaped saddles 22 are welded or otherwise suitably secured to the top of the telescoping members 18 and receive the flexible strands 10 and 11. A return roller 23 is mounted on the cross strut 17 by any suitable means 24 and supports the return reach 25 of the conveyor belt.

Troughing idler assembly 14 in FIGURE 2 consists essentially of a center or primary training roller 26 connected by universal joint connectors 27 and 28 to end or wing rollers 29 and 30. Connector assemblies 31 and 32 suspend the idler assembly from the flexible strands 10 and 11.

Figure 3:
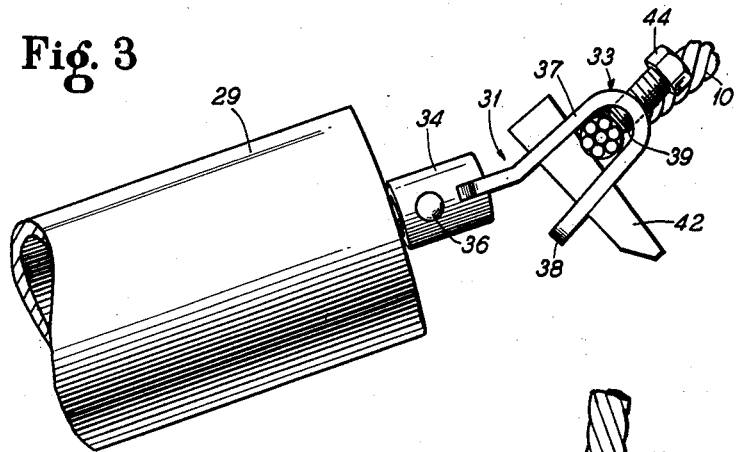
FIGURE 3 is an elevation of a portion of a wing roller and its flexible strand connector.
Figure 4:
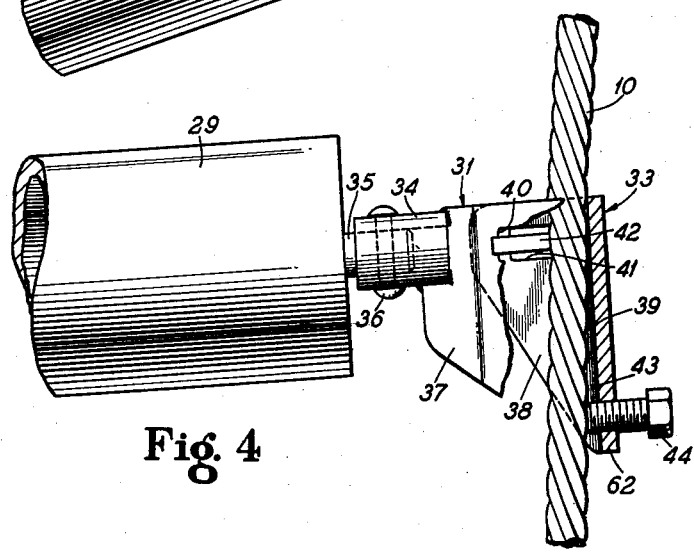
FIGURE 4 is a plan view of the roller and connector structure of FIGURE 3.

In FIGURES 3 and 4, connector 31 is shown as including a U-shaped member 33 rigidly connected to a sleeve 34 which is connected to the projecting shaft 35 of the right wing roller by pin 36. Member 33 includes upper and lower flaps or legs which form a seat 39 that receives the flexible strand 10. Each of the upper and lower flaps are formed with apertures 40 and 41 generally aligned with one another. A wedge 42 passes through the apertures and forces the flexible strand into the seat. Although a pair of apertures have been shown, it is possible to obtain approximately the same effect with the use of a single aperture.

The flaps extend along the strand as at 43 to form a continuous seat projecting considerably further in one direction from the intersection of the projection of the roller shaft with the stand than in the other. A bolt 44 or other suitable adjusting means is threaded through the extending portion 43 and engages the flexible strand to displace the seat from the strand.

The universal joint 28 between the center roller 26 and wing roller 30 is illustrated in FIGURES 6 and 7. Center roller shaft 45 and right wing roller shaft 46 are pivoted between pairs of legs 47 and 48 by suitable pins 50 and 51. The joint permits movement of the shaft ends with respect to one another in both horizontal and vertical directions.

The use and operation of the invention is as follows:

The imposition of a troughing load on the flexible strands 10 and 11 will cause inward movement of the strands between adjacent support stands. The amount of inward movement will be roughly proportional to the load, but even the naked weight of the troughing idler assemblies and the belt will cause some inward flexing. In FIGURE 1, those portions of the conveyor belt adjacent the support stands indicated at 54, 55 and 56, 57 will be inwardly and outwardly directed respectively with respect to the direction of travel of the belt. The mid-portions 58, 59 will be substantially parallel.

The training effect of any roller will generally be directed in a path transverse to the longitudinal axis of the roller. In FIGURE 1, for example, the outer ends of the wing rollers 29 and 30 are shown canted toward the direction of belt travel so that the training effect is in the direction of the arrows 60 and 61 respectively.

If the roller assemblies are merely connected to the flexible strands by a hook at a point which falls generally in line with the ends of the roller shafts so that the roller assemblies are free to swing as a pendulum about the points of connection, the individual rollers may, under certain adverse conditions, tend to move forward in the driection of belt travel. In this position, the training effect may be directed outwardly, and the detraining effect exerted by the roller up which the belt climbs is progressively increased. As a result the belt will run wild off to one side.

In the present construction, the rigid connectors 31 and 32 maintain the outer ends of the wing rollers canted in the direction of belt travel.

In the left roller assembly of FIGURE 1, the natural inward inclination of flexible strand portions 54 and 55 in cooperation with the rearwardly extending seat 39 of the connector maintains the outer ends of the roller shafts canted in the direction of travel so long as there is a rigid connection between the seat 39 and the projecting shaft ends. In essence, the additive effects of the inwardly directed strand portions 54, 55 and the rigid connector combine to properly position the rollers.

The mid-portions 58 and 59 of the flexible strands will not properly position the right troughing idler assembly of FIGURE 1 because they are substantially parallel, and the belt friction on the rollers may swing the assembly forward into a detraining position. To eliminate this swing, the adjusting bolts 44 are turned in to displace the left end 62 of the connectors outwardly from the strands 10 and 11. Since the shaft ends are rigid with respect to the seat 39, at least in the direction of belt travel, movement of the inner or left end 62 of the connectors outwardly will incline the outer ends of the wing rollers in the direction of belt travel.

Since the amount of training effect will be roughly proportional to the amount of contact between the belt and roller, any displacement of the belt up one roller and down the other will be automatically compensated, because the increased training effect exerted by the roller up which the belt climbs will overbalance the detraining effect in the system and force the belt into a centered position.

Similar adjustments may be made on connectors 31 and 32 in the left roller assembly if required. All adjustments may be quickly and accurately made so that repeated starting and stopping of the belt during training operations is avoided. In some cases it may even be possible to train the belt during operation.

Various modifications and refinements will be obvious to one skilled in the art. For example it is not essential that both the upper and lower flaps 37 and 38 be apertured, as only an upper aperture may be sufficient. The particular shape of the connector is not limited to the solid flaps. Since that portion of the seat 39 between the wedge and the adjusting bolt is not in engagement with the strand, it could be omitted. In addition, the particular adjusting means shown is not critical. For example, an adjusting screw passing through the connector parallel to the wedge and forcing the strand into engagement with another seat could be utilized. Similarly, the particular universal joint illustrated in FIGURES 6 and 7 is not essential, as any connector permitting relative longitudinal and vertical movement of the shaft ends would be feasible.

Furthermore, it is not essential that the U-shaped connector be rigid in all directions as illustrated in the drawings, for it is only essential that there be no radial movement of the ends of the roller shaft about their point of intersection with the flexible strands. In fact, in some instances it may be advantageous to provide flexibility at the point of connection between the roller shaft ends and the connectors 31, 32 in a vertical plane transverse to the direction of belt travel as viewed in FIGURE 2. Similarly, although a right angle between the seat 39 and the inwardly extending upper leg 37 which connects to the roller shaft end 35 has been shown, it is possible to utilize other more convenient angles.

The foregoing description is illustrative only and not definitive. Accordingly, the invention should not be limited except by the scope of the following appended claims.

I claim:

1. A connector for joining a troughing roller assembly to a flexible strand of a flexible strand conveyor, said connector including, in combination, a body member forming a seat adapted to receive a flexible strand, said body member having a projecting portion connectible to a roller shaft, said projecting portion being restrained from movement having a directional component parallel to the strand, means for holding the flexible strand in engagement with the seat, and means for moving a portion of the seat remote from the projection of the point of intersection of the roller shaft with the flexible strand away from the strand to thereby vary the angle between the roller shaft and strand.

2. A connector for joining a shaft of a troughing roller assembly to a flexible strand of a flexible strand conveyor, said connector including, in combination, a body member having a pair of rigid legs forming a seat therebetween, at least one of the legs being formed and adapted to be secured to a shaft whereby relative movement having a directional component parallel to the strand between the shaft and leg is prevented, said seat extending substantially further from the point of intersection of the projection of the shaft and the flexible strand along the strand in one direction than in the opposite direction, securing means for preventing relative longitudinal movement between the strand and the seat, and means for displacing that portion of the body most remote from the point of intersection of the projection of the shaft and strand away from the strand to thereby vary the position of the shaft with respect to the strand.

3. The connector of claim 2 further characterized in that the securing means is positioned substantially at the point of intersection of the projection of the roller shaft with the flexible strand.

4. A flexible troughing roller assembly for a flexible strand conveyor, said roller assembly including, in combination, a plurality of interconnected rollers including a center training roller and at least a pair of flanking wing rollers, the wing rollers having carrying shafts, and connecting means for varying the angular relationship of the outermost wing rollers to the flexible strand, said connecting means including a rigid member adapted to connect a wing roller carrying shaft to the flexible strand, said member having an outwardly extending portion engageable with the shaft end, and means for moving the rigid member and shaft end together about the flexible strand in a generally horizontal plane.

5. A flexible strand conveyor including a pair of generally parallel strands trained along a course such as a mine run, a plurality of supporting structures located at intervals for supporting the flexible strands, and a plurality of troughing roller assemblies forming a bed for a conveyor belt suspended from the flexible strands, each assembly comprising at least a center load carrying roller and a pair of wing rollers, said wing rollers each having a carrying shaft, and a pair of connector assemblies for connecting the roller assembly to the flexible strands to thereby vary the direction of cant of the wing rollers with respect to the direction of belt travel, each of said connector assemblies including a connecting member having a seat adapted to receive a flexible strand and a projecting member extending rigidly outwardly from the seat, said outwardly projecting member receiving a wing roller carrying shaft, means for forcing the flexible strand into seated engagement with the connecting member, and adjusting means for pivoting the connecting member about the strand in a generally horizontal plane to thereby vary the angle between the wing roller carrying shaft and strand.

6. A connector assembly for varying the position of a roller shaft with respect to a flexible strand in a flexible strand conveyor, said connector assembly including, in combination, a body member having a pair of generally parallel legs forming a seat therebetween, at least one of said legs being adapted for connection to a roller shaft end, said body member having one end terminating, in one direction along the strand, slightly beyond the point of intersection of the projection of the roller shaft and the flexible strand, and extending a substantially greater distance along the flexible strand in the opposite direction, wedge means for forcing that portion of the flexible strand substantially at the point of intersection of the shaft and strand into engagement with the seat, and adjusting means for displacing that portion of the seat most remote from the point of intersection of the projection of the shaft with the strand away from the strand.

7. A troughing roller assembly for a flexible strand conveyor, said troughing roller assembly including, in combination, a plurality of interconnected rollers, said interconnected rollers including at least an intermediate roller and a pair of flanking wing rollers, all of the rollers having carrying shafts, means for connecting the inner ends of each of the wing rollers to the adjacent intermediate roller to provide universal flexing movement between each of the wing rollers and its adjacent intermediate roller, and connecting means for varying the angular relationship of each of the outermost wing rollers to a flexible strand to which the troughing roller assembly is to be connected, said connecting means including a rigid member adapted to connect a wing roller carrying shaft to a flexible strand, said rigid member restraining the wing roller carrying shaft from movement in generally horizontal planes with respect to said rigid member, said rigid member having an outwardly extending portion engageable with the shaft end, and means for moving the rigid member and shaft end together about the flexible strand in a generally horizontal plane.

8. A flexible strand conveyor, said conveyor including, in combination, a pair of parallel strands trained along the conveying run, a plurality of supporting structures positioned at intervals along the run and supporting the flexible strands, a flexible conveyor belt, and a plurality of troughing roller assemblies forming a bed for the flexible conveyor belt, each troughing roller assembly including at least an intermediate roller flanked by a pair of wing rollers, each of the wing rollers being connected, at its inner end, to the adjacent intermediate roller for universal flexing movement, said wing rollers each having a carrying shaft, and a pair of connector assemblies for connecting the roller assembly to the flexible strands to thereby vary the direction of cant of the wing rollers with respect to the direction of belt travel, each of said connector assemblies including a connecting member having a seat adapted to receive a flexible strand and a projecting member extending rigidly outwardly from the seat, said outwardly projecting member receiving a wing roller carrying shaft and restraining said carrying shaft from movement in a generally horizontal plane, means for forcing the flexible strand into seated engagement with the connecting member, and adjusting means for pivoting the connecting member about the strand in a generally horizontal plane to thereby vary the angle between the wing roller carrying shaft and its adjacent flexible strand.

9. A connector assembly for connecting a roller shaft of a troughing roller assembly to a flexible strand in a flexible strand sideframe conveyor, said connector assembly including, in combination,
    a body portion having a seat formed therein for the reception of a flexible strand,
    an extension member extending from the body portion and adapted for connection to an adjacent roller shaft in such fashion as to restrain flexing movement between a roller shaft and the body portion in generally horizontal directions,
    said body portion having one end terminating, in one direction, substantially at the point of intersection of the projection of a roller shaft connected to the extension member with a flexible strand to which the connector assembly is secured,
    said body portion having its opposite end terminating, in the opposite direction, a substantial distance from the aforesaid point of intersection,
    said distance being long enough to enable the seat in the body portion to lie substantially parallel to a flexible strand to which the connector assembly may be connected, and
    means for forcing the body portion into snug engagement with a flexible strand in the vicinity of the aforesaid projection.

10. A flexible strand sideframe conveyor, said conveyor including, in combination,
    a pair of flexible strand sideframes trained along a conveying course,
    a plurality of flexible strand support structures located at intervals along the conveying course,
    a plurality of troughing idler assemblies carried by the flexible strand sideframes between adjacent support structures,
    a plurality of return roller assemblies along the conveying course,
    an orbitally movable conveyor belt, said belt having a conveying reach supported by the troughing idler assemblies and a return reach supported by return roller assemblies,
    the troughing idler assembly adjacent each support location in a downstream direction including a plurality of rollers, each outermost roller being connected to its adjacent roller by means providing at least a limited range of pivotable movement of the adjacent rollers with respect to one another in all directions, and
    a pair of connector assemblies for connecting the troughing idler assembly next adjacent each support structure to the flexible strand sideframes,
    each connector assembly including a body portion having a seat formed therein for the reception of a flexible strand, an extension member extending from the body portion and adapted for connection to an adjacent roller shaft in such fashion as to restrain flexing movement between a roller shaft and the body portion in generally horizontal directions, said body portion having one end terminating, in one direction, substantially at the point of intersection of the projection of a roller shaft connected to the extension member with a flexible strand to which the connector assembly is secured, said body portion having its opposite end terminating, in the opposite direction, a substantial distance from the aforesaid point of intersection, said distance being long enough to enable the seat in the body portion to lie substantially parallel to a flexible strand to which the connector assembly may be connected, and means for forcing the body portion into snug engagement with a flexible strand in the vicinity of the aforesaid projection.

References Cited in the file of this patent
UNITED STATES PATENTS

| | | |
|---|---|---|
| 2,833,385 | Lo Presti | May 6, 1958 |
| 2,862,608 | Newton | Dec. 2, 1958 |
| 2,880,851 | Salmons | Apr. 7, 1959 |